United States Patent [19]

Boeuf et al.

[11] 4,259,197

[45] Mar. 31, 1981

[54] PROCESS OF PREPARING FERRITE POWDERS

[75] Inventors: Jean-Marie Boeuf, Grenoble; Pierre Gerest, Allevard; Henri Lemaire, La Tronche, all of France

[73] Assignee: Aimants Ugimag S.A., Saint-Pierre-d'Allevard, France

[21] Appl. No.: 138,532

[22] Filed: Apr. 9, 1980

Related U.S. Application Data

[63] Continuation of Ser. No. 876,355, Feb. 9, 1978, abandoned.

[51] Int. Cl.[3] .............................................. C04B 35/26

[52] U.S. Cl. ................................ 252/62.58; 252/62.6; 252/62.63; 423/594

[58] Field of Search ................. 252/62.58, 62.6, 62.63; 423/594

[56] References Cited

U.S. PATENT DOCUMENTS

| | | | |
|---|---|---|---|
| 3,716,630 | 2/1973 | Shirk | 252/62.58 |
| 3,897,355 | 7/1975 | Arend et al. | 252/62.58 |

FOREIGN PATENT DOCUMENTS

| | | | |
|---|---|---|---|
| 284335 | 4/1966 | Australia | 252/62.63 |
| 1955611 | 6/1970 | Fed. Rep. of Germany | 252/62.58 |
| 355103 | 9/1972 | U.S.S.R. | 252/62.58 |
| 367466 | 3/1973 | U.S.S.R. | 252/62.58 |

*Primary Examiner*—Jack Cooper
*Attorney, Agent, or Firm*—McDougall, Hersh & Scott

[57] ABSTRACT

The invention relates to a process for preparing ferrite powders of Ba, Sr, and/or Pb intended to be incorporated in an elastomeric, thermoplastic, or thermosettable binder for manufacturing flexible or rigid permanent magnets.

The process consists of starting out with a mixture of $\alpha$ $Fe_2O_3$ iron oxides and carbonates of Ba, Sr and/or Pb, adding to said mixture one or more alkaline and/or alkaline earth halides in a total proportion of 0.5 to 15% of the total weight of the mixture, and one or more oxygenated boron compounds, more particularly, alkaline and/or alkaline earth borates, in a proportion of 0.2 to 7%, and calcining said mixture between 850° and 1100° C. for at least 15 minutes.

5 Claims, No Drawings

PROCESS OF PREPARING FERRITE POWDERS

This application is a continuation of application Ser. No. 876,355, filed Feb. 9, 1978, now abandoned.

The present invention relates to a process for preparing ferrite powders that are to be incorporated in a thermoplastic, thermosettable, or elastomeric binder, in order—after having been put into a form that permits the mechanical and/or magnetic orientation of the particles—to make permanent magnets, agglomerates or rigids, with high magnetic properties.

At present two techniques are being employed for preparing such powders. The older one consists of calcining a mixture of $\alpha Fe_2O_3$ iron oxide and barium carbonate, strontium carbonate or a combination of these carbonates at a high temperature, between 1200° and 1300° C. When leaving the calcining furnace, the ferrite is in a highly sintered state due to the high temperature at which it was formed. Therefore, it must undergo elaborate crushing for the purpose of obtaining an approximate particle size of one micron. Then one must carry out a recovery treatment between 800° and 1100° C. in order to regenerate the magnetic properties that were partially destroyed in the course of the crushing. The ferrite powder is then ready for use.

The second, more recent technique consists of incorporating a flux into the mixture of iron oxides and carbonates, prior to calcining, so as to favor the formation of the ferrite at a low temperature. Or else this flux can be introduced in a large amount so as to obtain molten glass by heating, such as is described, for instance, in French Pat. No. 2.048.413, where the added flux is boric oxide, $B_2O_3$. in a molar proportion of 26.5% of the total mixture. This technique results in a high market price due to the cost and great quantity of flux, and due to the necessity of having to eliminate it from the obtained powder.

Or else, on the other hand, the flux—it would be more accurate in this case to call it a "mineralizer"—is introduced into the mixture in a small quantity, on the order of several %. In this way one can accomplish the formation of the ferrite below 1100° C., even at 1000° C., and it is then no longer advantageous to carry out the crushing; simple crumbling, followed by an acidic wash and rinsing will suffice to make the powder ready for use.

In British Pat. No. 1,022,969 various reaction temperature reducing salts are indicated, for example, halides, particularly fluorides, or chromates or borates for lowering the calcining temperature when making sintered ferrite magnets. Although the thusly obtained powders have not been previously tested in composite magnets, they can be incorporated in an elastomer and after calendering which makes it possible to obtain a preferential distribution of the ferrite particles, products are obtained whose magnetic properties, expressed in specific energy (BH) max, range from 1 to $1.4^{106}$ G Oe.

Thus, French Pat. No. 2.104.252 described the use of a mixture of NaF+PbO as the mineralizer. But in order to obtain satisfactory magnetic properties it is necessary to start out with a particular acicular iron oxide, $\alpha$ $Fe_2O_3$, with a large specific surface area (>20 $m^2/g$) which constitutes an expensive raw material. Moreover, the use of lead oxide is rather risky, because of its high toxicity.

French Pat. No. 2.104.251 proposes to add either a mixture of $Bi_2O_3$+NaF, or barium chloride, $BaCl_2$. One obtains satisfactory magnetic properties, but the described procedures reveal serious drawbacks when they are transposed to the industrial stage. Thus $Bi_2O_3$ has the same drawback as PbO, because it is rather extremely toxic.

In the case of $BaCl_2$, in the course of calcining, hydrochloric acid is formed which may cause partial destruction of the ferrite. In both cases, and particularly in the second one, the calcining temperature is rather high, greater than 1000° C., and the calcined product is crumbled only with difficulty. In order to obtain the indicated magnetic properties, one is obliged to use a crushing operation which makes it necessary to recover the calcined powder, therefore constituting an additional operation.

The present invention proposes to remedy these drawbacks. It makes it possible to obtain ferrite powders that can be incorporated in a thermoplastic, or a thermosettable, or an elastomeric binder so as to make permanent magnets, agglomerates or rigids, that have excellent magnetic properties, and may even reach a specific energy BH max of $1.8^{106}$ G Oe, while using, for preparing the mixture:

common iron oxides of various origins (natural, synthetic, or recovered oxides), or mixtures of these oxides.

non-toxic additives without resorting either to subsequent crushing or to recovery of the calcined powders, and all under good economic conditions.

According to the invention, the process of preparing ferrite powders of Ba, Sr and/or Pb that are intended to be incorporated in a thermoplastic, thermosettable, or elastomeric binder in order to obtain permanent magnets, flexible agglomerates or rigids, with excellent magnetic properties after they have been put in a form that allows the mechanical and/or magnetic orientation of the ferrite particles, consists of starting out with a mixture of iron oxide, $Fe_2O_3$ $\alpha$, and a carbonate of Ba, Sr, and/or Pb, adding to said mixture one or more alkaline and/or alkaline earth halides in a total proportion of 0.5 to 15% (and preferably 1 to 10%) of the total weight of the mixture, and one or more oxygenated boron compounds, paticularly alkaline or alkaline earth borates in proportions of 0.2 to 7% (and preferably 0.5 to 3%) of the total weight of the mixture, calcining said mixture between 850° and 1100° C. (and preferably 900° to 1000° C.) for at least 15 minutes.

In fact, the applicant has found surprisingly that the association of these two kinds of mineralizers has a rather pronounced synergetic effect, in other words, the powders made in accordance with the invention make it possible to achieve for agglomerated magnets magnetic properties that are considerably superior to those that would be obtained if each mineralizer were used separately. The conjonction of these two mineralizers lead to independent single domain one-micron-size particles, having a high shape anisotropy ratio particularly useful for mechanical orientation.

Otherwise, the introduction of slight amounts of boron and fluor in the lattice of oxygens can be useful for hindering the appearance of defects when calendering, these defects playing a major role in the reversal of the magnetization.

The magnetic powdered material prepared by the process according to the invention, presents a distribution curve relating the intrinsic coercivity of the individual grains to their fraction volume which can be controlled in order to keep, after being incorporated in a binder and calendering, lower than 15% of the amount of the grains having an intrinsic coercivity lower than 300 Oesteds or lower than 30% of the amount of the grains having a coercivity lower than 2500 Oersteds. Under these conditions, the permanent magnets always show an intrinsic coercivity higher than 2400 Oersteds.

The halide that is preferably used is sodium fluoride. The borate that is preferably used is hydrated sodium tetraborate $B_4O_7Na_2$, $10OH_2O$ which appears as an impalpable powder with a very large specific surface. Good results are obtained when the proportion by weight of the sodium fluoride in the original mixture is 2 to 5 times approximately the ponderal porportion of tetraborate and, more particularly, when one has from 0.5 to 3% of $B_4O_7Na_2$, 10 $H_2O$, and 3 to 10% of NaF.

The iron oxides used may be of a very varying nature which makes it possible to supply them under the optimum prevailing economic conditions. They may be natural oxides, synthetic oxides, oxides obtained from the recovery of ironworking products ("expickling" oxides) for instance by the high temperature cracking of a solution of iron chloride, iron hydroxides, or a mixture of these different oxides or hydroxides. These oxides are crushed until they have a specific surface area greater than 5 $m^2/g$. One can, moreover, be satisfied with even smaller specific surfaces if one is interested only in the magnetic properties of residual magnetism.

The oxides and carbonates can be mixed in the form of powders, in a solid and liquid medium. Preferably, the carbonate is barium carbonate and the molar ratio $n=Fe_2O_3/BaCO_3$ lies between 4.6 and 6.2. The mineralizer can be introduced into the mixture either dry or in the wet way. The oxide-carbonate-borate-halide mixture is then calcined between 900° and 1000° C. in a circulating hot air furnace for a period ranging from 15 minutes to several hours, depending on the original material. Thereupon the obtained product is crumbled, then washed, for example with hydrochloric acid diluted to 5%, and the whole is then brought to a boil for 15 minutes. It is then rinsed until a practically neutral pH is obtained, and is then dried. The powder is incorporated in an elastomeric, thermoplastic, or thermosettable matrix which serves as a binder, thanks to an internal mixer. The powder-binder mixture then is subjected to a shaping operation by calendering, extrusion, injection, or compression which imparts a mechanical orientation to the ferrite particles and gives the product the desired shape. If necessary, this operation may be carried out in the presence of a magnetic field that enhances the magnetic properties even more.

The invention will be illustrated by a given number of special examples taken from experiments made by the applicant under the following operating conditions:

a mixture of iron oxide, barium carbonate, and halide with rapid dry mixing;

an addition of borate dissolved in water. A sludge is obtained which is mixed carefully before drying and crumbling;

calcining in a furnace for 1 hour at 950° C. and crumbling;

washing in a 5% HCl solution brought to boiling for 15 minutes;

successive rinsing operations for 15 minutes in boiling water;

drying of the powder in an oven at 150° C.;

introduction into the rubber in a ratio of 90% of powder for 10% of rubber by weight, and calendering.

The contents of the various constituents are expressed in % of the total weight of the original mixture. The magnetic properties obtained for the flexible magnet are expressed in the following units:

remanent saturation induction Br in Gauss
coercive field Hc in Oersteds
intrinsic coercivity iHc in Oersteds
specific energy (BH) max in Gauss Oersteds $\times 10^6$.

EXAMPLE 1

This example compares the results obtained from introducing boron only (A), fluoride only (B), and a mixture of borate and fluoride (C).

TABLE I

| | | A | B | C |
|---|---|---|---|---|
| Starting mixture | $\alpha Fe_2O_3$ | 80,7 | 77,0 | 75,8 |
| | $BaCO_3$ | 17,8 | 17,0 | 16,7 |
| | NaF | — | 6,0 | 6,0 |
| | $B_4O_7Na_2$ | 1,5 | — | 1,5 |
| Results | Br | 2520 | 2460 | 2650 |
| | Hc | 2220 | 2250 | 2370 |
| | iHc | 3800 | 4400 | 3200 |
| | BHmax | 1,50 | 1,43 | 1,77 |

One notices the marked synergetic effect of the fluoride+borate addition, compared to the addition of the one or the other of the mineralizers. This effect is clear on the remanent induction as well as on the coercive field, and is manifested above all on the specific energy.

EXAMPLES 2 to 9

In the course of another series of experiments, the NaF content and the $B_4O_7Na_2$ content were varied simultaneously. The results are shown in Table II.

EXAMPLES 10 to 12

A chloride (NaCl) and an iodide (IK) were substituted for the NaF, and calcium diborate was substituted for the sodium tetraborate. The results are given in Table III.

TABLE II

| Example N° | 2 | 3 | 4 | 5 | 6 | 7 | 8 | 9 |
|---|---|---|---|---|---|---|---|---|
| $Fe_2O_3$ | 78,2 | 77,8 | 77,4 | 77,0 | 76,6 | 76,2 | 75,8 | 75,4 |
| $BaCO_3$ | 17,3 | 17,2 | 17,1 | 17,0 | 16,9 | 16,8 | 16,7 | 16,6 |
| NaF | 4,0 | 4,0 | 4,0 | 4,0 | 6,0 | 6,0 | 6,0 | 6,0 |
| $B_4O_7Na_2$ | 0,5 | 1,0 | 1,5 | 2,0 | 0,5 | 1,0 | 1,5 | 2,0 |
| Br | 2550 | 2630 | 2500 | 2480 | 2580 | 2650 | 2690 | 2670 |
| Hc | 2300 | 2350 | 2080 | 2090 | 2360 | 2420 | 2410 | 2340 |
| iHc | 3400 | 3200 | 3700 | 3700 | 3500 | 3650 | 3000 | 3250 |
| (BH)max | 1,55 | 1,68 | 1,44 | 1,43 | 1,60 | 1,70 | 1,75 | 1,71 |

TABLE III

| Example N° | 10 | 11 | 12 |
|---|---|---|---|
| $Fe_2O_3$ | 76,2 | 79,5 | 77,8 |

TABLE III-continued

| Example N° | 10 | | 11 | | 12 |
|---|---|---|---|---|---|
| $BaCO_3$ | 16,8 | | 17,5 | | 17,2 |
| NaF | 6,0 | IK | 1,5 | NaCl | 4,0 |
| $Ca(BO_2)_2$ | 1,0 | $B_4O_7Na_2$ | 1,5 | $B_4O_7Na_2$ | 1,0 |
| Br | 2610 | | 2630 | | 2660 |
| Hc | 2370 | | 2230 | | 2390 |
| iHc | 3530 | | 3110 | | 3420 |
| (BH)max | 1,65 | | 1,64 | | 1,71 |

We claim:

1. In a process for preparing ferrite powders of Ba, Sr or Pb that are to be incorporated in an elastomeric, thermoplastic, or thermosettable binder for the purpose of obtaining flexible or rigid permanent magnets with high magnetic properties, the process comprising the steps of preparing a mixture of particles of $Fe_2O_3$ and at least one carbonate of Ba, Sr or Pb, calcining the mixture to produce Ba, Sr or Pb ferrite powder, the powder being then adapted for incorporation in said binder and for orientation in the binder, the improvement in said process comprising the steps of adding to said mixture NaF in a total amount of 0.5% to 15% of the total weight of said mixture, and sodium tetraborate ($B_4O_7Na_2 10H_2O$) in a total amount of 0.2 to 7% of the weight of said mixture, thereafter calcining the mixture between 850° and 1100° for at least 15 minutes, crumbling the calcined mixture, and acid washing, water rinsing and drying the mixture, the powder obtained comprising single domain, approximately one micron size particles suitable for direct incorporation and orientation in said binder, the magnets obtained upon incorporation and orientation of said powder in said binder being characterized by higher Br, Hc and BHmax properties than magnets obtained utilizing powder prepared by the above process but having only one of the additives NaF and sodium tetraborate.

2. A process as claimed in claim 1 wherein the NaF is present in a total amount of 1–10% by weight of the total mixture.

3. A process according to claim 1 wherein the tetraborate is present in an amount between 0.5% to 3% of the total weight of the mixture.

4. A process according to claim 1 wherein the NaF is in powdered form and wherein the powdered proportion of NaF in the mixture is between 2 and 5 times the proportion of the tetraborate.

5. A process according to claim 1 wherein the tetraborate is introduced in the dissolved state in water.

* * * * *